US005504164A

United States Patent [19]

O'Donnell

[11] Patent Number: 5,504,164

[45] Date of Patent: Apr. 2, 1996

[54] CURING SYSTEMS FOR COMPOSITIONS CONTAINING HALOGENATED COPOLYMERS OF ISOBUTYLENE AND PARA-METHYLSTRENE

[75] Inventor: Kevin O'Donnell, Victoria, Australia

[73] Assignee: Exxon Chemical Patents Inc., Wilmington, Del.

[21] Appl. No.: 416,406

[22] Filed: Apr. 4, 1995

Related U.S. Application Data

[62] Division of Ser. No. 237,093, May 3, 1994, abandoned.

[51] Int. Cl.[6] .............................. C08C 19/20; C08K 5/10

[52] U.S. Cl. .......................... 525/346; 524/313; 525/194; 525/349

[58] Field of Search .................................... 525/349, 348, 525/351, 354, 346

[56] References Cited

U.S. PATENT DOCUMENTS 5,063,268 11/1991 Young .................................... 524/286

5,252,649 10/1993 Hausmann ............................. 524/313

*Primary Examiner*—Christopher Henderson

*Attorney, Agent, or Firm*—M. B. Kurtzman

[57] ABSTRACT

The present invention provides for sulfur curable compositions containing a halogenated copolymer of a $C_4$ to $C_7$ isomonoolefin, e.g., isobutylene and a para-alkylstyrene, e.g., para-methylstyrene, and further containing a polyunsaturated fatty acid glyceride having an iodine value in excess of 100, e.g. tung oil. The composition may comprise a mixture of the halogenated copolymer and at least one other unsaturated elastomer. In-situ reaction between the halogenated copolymer and the fatty acid glyceride during rubber compounding imparts unsaturation to the halogenated copolymer which permits facile vulcanization and covulcanization using conventional sulfur curatives.

1 Claim, No Drawings

CURING SYSTEMS FOR COMPOSITIONS CONTAINING HALOGENATED COPOLYMERS OF ISOBUTYLENE AND PARA-METHYLSTRENE

This is a divisional, of application Ser. No. 08/237,093, filed May 3, 1994, now abandoned.

BACKGROUND OF THE INVENTION

1. Field of the Invention

The present invention relates to promoted sulfur curing systems for elastomer compositions containing halogenated elastomeric copolymers of a $C_4$ to $C_7$ isomonoolefin and para-alkylstyrene.

2. Description of the Related Art

Halogenated copolymers of isobutylene and up to about 4 mole % of isoprene (butyl rubber) are well known polymer materials whose vulcanizates offer some outstanding properties not possessed by many other diolefin based elastomers. Articles prepared from many cured halogenated elastomers offer improved resistance to oils and greases as well as resistance to oxygen and ozone degradation. Butyl rubber vulcanizates exhibit good abrasion resistance, excellent impermeability to air, water vapor and many organic solvents, as well as resistance to aging and sunlight. These properties render these materials ideal candidates for one or more applications such as water hoses, organic fluid hoses, components in tire construction, gaskets, adhesive compositions and various molded articles.

More recently, a new class of halogenated elastomeric interpolymers have been discovered which offer many of the same properties as halogenated butyl rubber, but are even more ozone and solvent resistant. These materials are the halogenation product of random copolymers of a $C_4$ to $C_7$ isoolefin, such as isobutylene, and a para-alkylstyrene comonomer wherein at least some of the alkyl substituent groups present in the styrene monomer units contain halogen.

More preferred materials are elastomeric copolymers of isobutylene and para-methylstyrene containing from about 0.5 to about 20 wt. % para-methylstyrene wherein up to about 65% of the methyl substituent groups present on the benzene ring contain a bromine or chlorine atom, preferably a bromine atom. These copolymers (hereafter referred to as HI-PAS) have a substantially homogeneous compositional distribution such that at least 95% by weight of the polymer has a para-alkylstyrene content within 10% of the average para-alkylstyrene content of the polymer. They are also characterized by a very narrow molecular weight distribution (Mw/Mn) of less than about 5, more preferably less than about 2.5, viscosity average molecular weights in the range of from about 300,000 up to about 2,000,000, and a glass transition temperature (Tg) of below about 50° C.

These copolymers may be prepared by slurry polymerization of the monomer mixture using a Lewis Acid catalyst, followed by halogenation, preferably bromination, in solution in the presence of halogen and a radical initiator such as heat and/or light and/or a chemical initiator.

Preferred brominated copolymers generally contain from about 0.1 to about 2 mole % of bromomethyl groups, most of which is monobromomethyl, with less than 0.05 mole % dibromomethyl substituents present in the copolymer. These copolymers and their method of preparation are more particularly disclosed in U.S. Pat. No. 5,162,445, the complete disclosure of which is incorporated herein by reference.

The aromatic halomethyl groups present in such copolymers permit facile cross linking to be accomplished in a variety of ways, including by means of zinc oxide or promoted zinc oxide curing systems normally used to cure halogenated butyl rubber. However, because these polymers do not contain ethylenic or allylic unsaturation, they are not normally curable using conventional sulfur or sulfur-containing curatives such as are used to cure diolefin elastomers, e.g., natural rubber, butadiene or isoprene based rubbers.

One important application for HI-PAS elastomers is their use as a blend component with sulfur curable unsaturated elastomers, e.g., natural rubber or polybutadiene, which normally lack good aging properties, ozone resistance, solvent resistance and the other physical properties inherent in HI-PAS elastomers. Optimization of the properties of such blends relies on suitable morphology of the blend and particularly on good co-vulcanization between the polymer components. However the cure of HI-PAS proceeds by a different chemical mechanism than the cure of unsaturated general purpose rubber (GPR) cured with sulfur, and it is generally necessary to include independent curing systems into such blends, one which is a cure for the HI-PAS elastomer and a sulfur system which is a cure for the unsaturated GPR. The lack of significant intervulcanization between the different polymer phases results in a diminution of important properties in cured articles prepared from such blends such as tensile, modulus, tear strength and resistance to chemical attack, as well as laminar adhesion between rubber stocks containing these different polymer phases.

It has been proposed in the prior art that brominated isobutylene/para-methylstyrene copolymers may be reacted with a tung oil acid (9, 11, 13-octadecatrienoic acid) in a nucleophilic substitution reaction such that a majority of the benzylic bromine is replaced to yield polymer-bound acid ester groups, as disclosed in Example 112 E of U.S. Pat. No. 5,162,445. It is disclosed that the resulting attached conjugated unsaturation permits facile vulcanization of the polymer and covulcanization of the polymer with unsaturated rubber using sulfur vulcanization curative and may also contain other ingredients normally present in curable elastomer compositions such as Zinc oxide, reinforcing carbon black, processing oils and the like.

The composition is prepared by mixing all components except for the curing agents at a temperature in the range of from about 100° C. to 180° C. for a period of time such that a uniform mixture is obtained and at least a portion of the fatty oil has reacted with the benzylic halogen present in the halogenated interpolymer to impart unsaturation thereto. The mixture is then compounded with a curing system containing sulfur and/or a sulfur-containing curative and vulcanized under standard conditions.

DETAILED DESCRIPTION OF THE INVENTION

The halogenated elastomer present in the curable composition of this invention is a chlorinated or brominated interpolymer of a $C_4$ to $C_7$ isomonolefin and a para-alkylstyrene or mixtures thereof with one or more other elastomers such as polybutadienes, copolymers of butadiene with styrene or acrylonitrile, natural rubber, synthetic polyisoprene, butyl rubber, halogenated butyl rubber or elastomeric copolymers of ethylene, propylene and up to 10 mole % of a non-conjugated diene (known as EPDM rubbers).

Halogenated interpolymers based on a $C_4$ to $C_7$ isomonoolefin, such as isobutylene, and a para-alkylstryrene, such as para-methylstyrene, are also now known in the art as evidenced by the aforementioned U.S. Pat. No. 5,162,445, the complete disclosure of which is incorporated herein by reference. These elastomers are inclusive of those described in the background section of this disclosure.

Preferred materials are the halogenation product of a random copolymer of a $C_4$ to $C_7$ isomonoolefin, such as isobutylene, and a para-alkylstyrene comonomer wherein at least some of the alkyl substituent groups present in the styrene monomer units contain halogen. Preferred materials may be characterized as isobutylene interpolymers containing the following monomer units randomly spaced along the polymer chains:

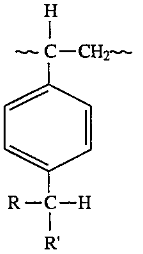

1.

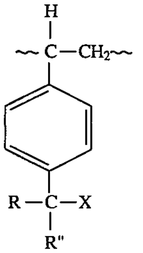

2.

wherein at least about 5% of the comonomer units present in the polymer chain are of the structure of formula 2, R and R' are independently hydrogen or $C_1$ to $C_4$ alkyl, R" is independently hydrogen, $C_1$ to $C_4$ alkyl or X, and X is bromine or chlorine, and wherein the interpolymer is otherwise substantially free of any halogen in the polymer backbone chain.

With reference isobutylene as the isoolefin comonomer, these interpolymers are inclusive of:

a) copolymers consisting of isobutylene and a monomer having the structure of formula 2 wherein R" is hydrogen or $C_1$ to $C_4$ alkyl, e.g., copolymers of isobutylene and a monohalo-substituted para-alkylstyrene;

b) terpolymers comprising isobutylene and a mixture of monomers having the structure of formulas 1 and 2 wherein R" is hydrogen or $C_1$ to $C_4$ alkyl, e.g., terpolymers of isobutylene, a para-alkylstyrene and a monohalo-substituted para-alkylstyrene;

c) terpolymers comprising isobutylene and a mixture of monomers having the structure of formula 2 wherein, with respect to a major proportion of the formula 2 monomer, R" is hydrogen or $C_1$ to $C_4$ alkyl and, with respect to a minor proportion of said formula 2 monomer, R" is bromine or chlorine, e.g., terpolymers of isobutylene, a mono-halo substituted para-alkylstyrene and a di-halo substituted para-alkylstyrene; and d) tetrapolymers comprising isobutylene and a mixture of monomers having the structure of formulas 1 and 2 wherein, with respect to major proportion of the formula 2 monomer, R" is hydrogen or $C_1$ to $C_4$ alkyl and, with respect to a minor proportion of said formula 2 monomer, R" is bromine or chlorine, e.g., tetrapolymers of isobutylene, a para-alkylstyrene, amonohalo-substitutedpara-alkylstyrene and a dihalo-substituted para-alkylstyrene.

As stated above, these halogenated interpolymers are prepared using a copolymer of a $C_4$ to $C_7$ isoolefin and a para-alkylstyrene as the halogenation substrate. Interpolymers having the composition (a), (b), (c) or (d) above will be produced as a function of the severity of the halogenation reaction. For example, mild halogenation will tend to yield interpolymers of the characteristics of (b), stronger halogenation will yield interpolymers of the characteristics of (a) or (d) and the strongest halogenation will yield terpolymers having the characteristics of (c).

The most preferred elastomers used in the compositions of the present invention are random elastomeric brominated terpolymers comprising isobutylene and para-methylstyrene (PMS) containing from about 0.5 to about 20 wt % PMS, more preferably from about 2 to about 15 wt % PMS, wherein up to about 65% of the PMS monomer units contain a mono-bromomethyl group. These elastomeric copolymers generally exhibit a number average molecular weight in the range of from about 50,000 to about 250,000, more preferably from about 80,000 to about 180,000. From about 5 up to about 65% of the total PMS monomer content of the terpolymer contains a mono-bromomethyl group with essentially no bromination occurring in the polymer backbone or in the aromatic ring. The bromine content of these terpolymers generally ranges from about 0.1 to about 5 mole %.

The key ingredient of the composition is the polyunsaturated fatty acid glyceride. When mixed with the halogenated interpolymer at elevated temperatures in the range of about 100° C. to 180° C., preferably in the presence of an alkylation catalyst, an electrophilic substitution reaction is found to occur in-situ wherein at least a portion of the unsatured fatty acid glyceride molecules are alkylated with molecules of the halogenated interpolymer i.e., benzylic halogen is substituted with fatty acid glyceride molecules either by double bond addition or by the formation of ester linkages, or a combination of both mechanisms. This reaction grafts fatty acid glyceride molecules at the benzylic site of the interpolymer and thereby imparts ethylenic unsaturation to the interpolymer. The resulting unsaturated interpolymer is thereby rendered curable with conventional sulfur curing systems by virtue of crosslinking through the allylic hydrogen present in the grafted glyceride molecules.

Suitable glyceride oils which may be used in accordance with this invention are polyunsaturated fatty acid glycerides having an iodine value in excess of about 100, preferably in the range of from about 100 to 200 and which are derived from vegetable or marine sources. Suitable oils contain at least two double bonds in at least some of the fatty ester acid molecules and include, rape, corn, sesame, cottonseed, soybean, sunflower, safflower, hemp, linseed, tung, oiticica, whale and fish oils. All of these oils are based on fatty acids which contain allylic hydrogen.

The more preferred oils are drying or semi-drying vegetable oils whose hydrolysis products contain a relatively high content of polyunsaturated fatty acids having from 18–22 carbon atoms, such as linoleic acid (two double bonds), linolenic acid (three double bonds), eleostearic acid (three conjugated double bonds), licanic acid (three conjugated double bonds), and parinaric acid (four conjugated double bonds). The most preferred oils are those having iodine values in excess of about 125 and include tung oil which is rich in eleostearic acid, oiticica oil which is rich in licanic acid, and hemp and linseed oils which are relatively rich in linolenic acid.

The oil may be added to the vulcanizable composition generally in the range of from about 0.1 to 10 parts by weight oil per 100 parts by weight rubber (phr). The more preferred level of oil addition ranges from about 0.5 to 7.5 parts by weight phr, most preferably from about 1–5 parts by weight phr.

The in-situ reaction between the halogenated interpolymer and the fatty acid glyceride is facilitated by mixing these components in the presence of an alkylation catalyst. Suitable catalysts are those which are soluble or dispersible in the rubber matrix and include zinc chloride, zinc oxide, mixtures of zinc oxide and fatty acids such as stearic acid, stannous chloride and ferric stearate. Addition levels may range from 0.1 to 5.0 phr, more preferably 0.2 to 1.0 phr.

The compositions of this invention preferably comprise a blend of the halogenated elastomer with one or a mixture of other elastomers such as natural rubber, polyisoprene, polybutadiene, copolymers of butadiene with styrene or acrylonitrile, EPDM elastomers, butyl rubber, halogenated butyl rubber and like materials. Such blends may contain from about 10 to about 90% by weight of each type of elastomer, based on the elastomer content of the blend. The most preferred blends are those containing the halogenated elastomer at levels of from about 10 to 50 by weight.

Suitable curing agents include sulfur and mixtures of sulfur with sulfur-containing accelerators such as thiuram sulfides, dithiocarbamates, thioureas, thiazoles, sulfanamides, guanidines and like materials. The curing agent may also comprise a resin cure such as phenolic resins, brominated phenolic resins and the like. The quantity of such curing agents added to the composition will generally range from about 1 to 6 parts phr, more preferably from about 1.5 to 4 parts phr.

Preferred curatives comprise a mixture of sulfur and an accelerator such as benzothiazyl disulfide, N-oxydiethylene benzothiazole-2-sulfonamide, 2-mercaptobenzothiazole, alkyl phenol disulfides, tetramethylthiuram disulfide, m-phenylenebismaleimide, N, $N^1$-diarylguanidines, and like known materials.

The sulfur curing system is preferably used as a cocurative in curing systems also containing zinc oxide or an equivalent thereof, e.g., zinc chloride, zinc bromide or ferric chloride, as a cocuring agent. Zinc oxide is normally used in such systems at a level of from about 0.2 to about 7 parts by weight per 100 parts by weight of elastomer. The present invention provides for particularly good low cure reversion where zinc oxide is present at relatively low levels in the range of from about 0.5 to about 3.5 parts by weight per 100 parts by weight of elastomer.

The vulcanizable composition may also contain other conventional additives known in the art, including fillers such as carbon black or silica, stabilizers, antioxidants, plasticizers, processing oils, pigments, flame retardants, blowing agents and like additives as is known in the art.

Examples of fillers include inorganic fillers such as carbon black, silica, calcium carbonate, talc and clay, and organic fillers such as high-styrene resin, coumaroneindene resin, phenolic resin, lignin, modified melamine resins and petroleum resins. The preferred filler is carbon black present at a level of from about 3 to 50 parts by weight per hundred parts by weight of total elastomer content of the blend, more preferably from about 20 to 40 parts by weight.

Examples of lubricants include petroleum-type lubricants such as oils, paraffins, and liquid paraffins, coal tar-type lubricants such as coal tar and coal tar pitch; fatty oil-type lubricants such as beeswax, carnauba wax and lanolin; fatty acids and fatty acid salts such as licinoleic acid, palmitic acid, barium stearate, calcium stearate and zinc laureate; and synthetic polymeric substances such as petroleum resins.

Examples of plasticizers include hydrocarbon oils, e.g., paraffin, aromatic and napththenic oils, phthalic acid esters, adipic acid esters, sebacic acid esters and phosphoric acid-type plasticizers.

Examples of tackifiers are petroleum resins, coumaroneindene resins, terpene-phenol resins, and xylene/formaldehyde resins.

Examples of coloring agents are inorganic and organic pigments.

Examples of blowing agents are sodium bicarbonate, ammonium carbonate, N,N'-dinitrosopenta-methylenetetramine, azocarbonamide, azobisisobutyronitrile, benzenesulfonyl hydrazide, toluenesulfonyl hydrazide, calcium amide, p-toluenesulfonyl azide, salicylic acid, phthalic acid and urea.

The vulcanizable composition may be prepared and blended using any suitable mixing device such as a two-roll mill, an internal mixer (Brabender Plasticorder), a Banbury Mixer, a kneader or a similar mixing device. Blending temperatures and times may range about 100° C. to 180° C. and from about 1 to 10 minutes respectively. The sequence of mixing, time of mixing and temperatures employed are such that a uniform dispersion of all components of the composition, except the curatives, is first achieved. These components include the polyunsaturated fatty acid glyceride and alkylation catalyst, and mixing should be conducted at a temperature and for a time such that an insitu reaction between the halogenated interpolymer and the glyceride is permitted to occur at this mixing stage.

A useful mixing procedure utilizes a Banbury mixer in which the halogenated polymer, the glyceride, the alkylation catalyst, the filler and a process oil are added and the composition mixed for the desired time or to a particular temperature to achieve adequate dispersion of the ingredients. Alternatively, the rubber and a portion of the filler (e.g., one-third to two-thirds) is mixed for a short time (e.g., about 1 to 3 minutes) followed by the remainder of the filler and oil. Mixing is continued for about 5 to 10 minutes at high rotor speed during which time the mixed compound reaches a preferred temperature of about 160° C. Following cooling, the compound is mixed with curatives in a second step to disperse the curatives at relatively low temperature, e.g., about 80° to about 120° C. Variations in mixing will be readily apparent to those skilled in the art and the present invention is not limited by the mixing procedure. The mixing is performed to disperse all components of the composition thoroughly and uniformly. systems. A disadvantage of this process is that it requires isolation of the tung oil acid and a complicated prereaction thereof with the brominated copolymer, which can add considerable complexity and expense to the preparation of the rubber.

Tung oil per se is also known as an additive to various curable rubber formulations to improve the properties of vulcanizates. For example, Japanese publications J01221441 and J01215838 disclose that the addition of 5–20 parts of tung oil to vulcanizable SBR formulations improves tire tread friction properties. J01118551 and J01118548 disclose that tires having improved anti-cut index are achieved by including about 3–5 parts by weight of tung oil into the vulcanizable composition. U.S. Pat. No. 3,169,566 discloses that a variety of unsaturated vegetable oils, including tung oil, reduce the surface tackiness, and hence improve the dirt resistance of light colored halogenated butyl rubber stocks such as white tire sidewalls.

SUMMARY OF THE INVENTION

The present invention provides for an improved sulfur-based curing system for compositions containing halogenated $C_{4-C7}$ isomonoolefin/para-alkylstyrene copolymers as well as mixtures thereof with unsaturated elastomers, which permits the utilization of the halogenated copolymer directly in its unmodified form. Compositions in accordance with this invention comprise a uniform mixture of: a) a chlorinated or brominated elastomeric interpolymer of a $C_4$ to $C_7$ isomonoolefin, such as isobutylene, and a para-alkylstyrene comonomer, such as para-methylstyrene; b) from 0 to about 90% by weight based on the elastomer content of said composition of at least one unsaturated elastomer, and c) a vulcanization promoter comprising an unsaturated fatty acid glyceride oil containing from about 18 to 22 carbon atoms and having an iodine value in excess of 100. The composition also contains sulfur and/or a sulfur-containing mixture on a two roll mill at 50° C. for about 7 minutes.

The curable mixtures were evaluated for vulcanization activity according to ASTM D-2084 using a Monsanto Oscillating Disc Rheometer and then physical properties of the vulcanizates were evaluated by vulcanizing test pads under the various cure conditions set forth in Table 1 using standard ASTM laboratory test practice as follows:

Mooney Viscosity—ASTM D-1646

Mooney Scorch—ASTM D-1646

Tensile Properties*—ASTM D-3182 through D-3192

Tensile Properties**—ASTM D-412

Ozone Resistance—ASTM D-3395-86 (Method A)

*Covers mixing conditions and curing

** Covers tension testing and tensile properties.

Vulcanization of a molded article, for example a curing element, may be carried out in heated presses under conditions well known to those skilled in the art. It is preferred that vulcanization be effected at temperatures of about 140° to about 250° C. and for periods of about 5 to about 60 minutes. Curing time will be affected by the thickness of the article and the concentration and type of curing agent as well as the initial halogen content of the halogenated polymer. However, the vulcanization parameters can readily be established with a few experiments utilizing e.g., a laboratory characterization device well known in the art, the Monsanto Oscillating Disc Cure Rheometer (described in detail in American Society for Testing and Materials, Standard ASTM D 2084).

The following examples are illustrative of the invention, The materials used in preparing the various formulations as abbreviated in the Tables were as follows:

EMDX 90-10 Random brominated copolymer of isobutylene and para-methylstyrene containing about 7.5% wt of para-methylstyrene, 2.0 wt % bromine (1.2 mole %), 0.07 calcium (as calcium stearate), 0.04 wt % phenolic antioxidant and having a Mooney Viscosity ML (1+8) at 125° to 45+5.

EMDX 89-4 Random brominated copolymer of isobutylene and para-methylstyrene containing about 5 wt % of para-methylstyrene, 1.2 wt % bromine (0.7 mole %), 0.07 wt % calcium (as calcium stearate), 0.04 wt % phenolic antioxidant and having a Mooney Viscosity ML (1+8) at 125° C. of 45±5.

BR-1220 Polybutadiene having a Mooney Viscosity ML (1+4) at 100° of about 40.

BR-01 Polybutadiene having a Mooney Viscosity ML (1+4) at 100° of about 44.

SMR-5 Natural Rubber (Standard Malaysian Rubber, Grade 5).

Diablack SHA Reinforcing grade carbon black.

GPF Black Reinforcing grade carbon black.

Sunthene 410 Naphthenic oil

MBTS 2-mercaptobenzothiazyl disulfide

Strucktol™ 4OMS Alkylated naphthenic/aromatic hydrocarbon resin (Strucktol Company).

Vultac #5 Alkyl phenol disulfide (Pennwalt Corporation).

CBS N-cyclohexyl-2-benzothiazylsulfenamide.

EXAMPLES 1–6

A series of formulations described in Table 1 were prepared by compounding the elastomers, fillers and other additives shown in the top half of Table 1 in a laboratory Banbury mixer. The mixtures were heated from a temperature of 80° C. up to 160° C. over a period of about 6 minutes, after which the master batch compositions were dumped from the mixer.

Portions of this master batch were then formulated with a curative mixture of sulfur vulcanization accelerators and the other curatives as shown in Table 1 by adding the curative mixture to the rubber stock and milling the

TABLE 1

| | | 1 | | 2 | | 3 | | 4 | | 5 | | 6 | |
|---|---|---|---|---|---|---|---|---|---|---|---|---|---|
| Formulation | S.G. | phr | g | phr | g | phr | g | phr | g | phr | g | phr | g |
| EMDX90-10 | 0.93 | 30 | 216.0 | 30 | 213.0 | 30 | 213.0 | 30 | 213.0 | 30 | 213.0 | 40 | 288.0 |
| SMR 5 | 0.93 | 30 | 216.0 | 30 | 213.0 | 30 | 213.0 | 70 | 497.0 | 70 | 497.0 | 20 | 144.0 |
| BR 1220 | 0.90 | 40 | 288.0 | 40 | 284.0 | 40 | 284.0 | 0 | 0.0 | 0 | 0.0 | 40 | 288.0 |
| Diablack SHA | 1.50 | 40 | 288.0 | 40 | 284.0 | 40 | 284.0 | 40 | 284.0 | 40 | 284.0 | 40 | 288.0 |
| Sunthene 410 | 0.90 | 12 | 86.4 | 12 | 85.2 | 12 | 85.2 | 12 | 85.2 | 12 | 85.2 | 12 | 86.4 |
| Stearic Acid | 0.92 | 1 | 7.2 | 1 | 7.1 | 1 | 7.1 | 1 | 7.1 | 1 | 7.1 | 1 | 7.2 |
| Zinc Stearate | 1.05 | 0.3 | 2.2 | 0.3 | 2.1 | 0.3 | 2.1 | 0.3 | 2.1 | 0.3 | 2.1 | 0.3 | 2.2 |
| Struktol 40 MS | 1.00 | 4 | 28.8 | 4 | 28.4 | 4 | 28.4 | 4 | 28.4 | 4 | 28.4 | 4 | 28.8 |
| Tung Oil | 1.00 | | 0.0 | 2 | 14.2 | 2 | 14.2 | 2 | 14.2 | 2 | 14.2 | | 0.0 |
| | 1 | | 0.0 | | 0.0 | | 0.0 | | 0.0 | | 0.0 | | 0.0 |
| | 1 | | 0.0 | | 0.0 | | 0.0 | | 0.0 | | 0.0 | | 0.0 |
| | 1 | | 0.0 | | 0.0 | | 0.0 | | 0.0 | | 0.0 | | 0.0 |
| | 1.00 | | 0.0 | | 0.0 | | 0.0 | | 0.0 | | 0.0 | | 0.0 |
| Total | | 157.3 | 1132.6 | 159.3 | 1131.0 | 159.3 | 1131.0 | 159.3 | 1131.0 | 159.3 | 1131.0 | 157.3 | 1132.6 |
| MB Sp Gr | | 1.049 | | 1.049 | | 1.049 | | 1.059 | | 1.059 | | 1.049 | |
| Batch Factor | | 7.2 | | 7.1 | | 7.1 | | 7.1 | | 7.1 | | 7.2 | |
| 1% Limitation, Min./Max. | | 1121.2 | 1143.9 | 1119.7 | 1142.3 | 1119.7 | 1142.3 | 1119.7 | 1142.3 | 1119.7 | 1142.3 | 1121.2 | 1143.9 |

TABLE 1-continued

| Curatives | | phr | g | phr | g | phr | g | phr | g | phr | g | phr | g |
|---|---|---|---|---|---|---|---|---|---|---|---|---|---|
| ZnO | 5.55 | 1 | | 1 | | 3 | | 1 | | 3 | | 1 | |
| Sulphur | 2.60 | 1 | | 1 | | 2 | | 1 | | 2 | | 1 | |
| Vultac #5 | 1.15 | 0.8 | | 0.8 | | | | 0.8 | | | | 0.8 | |
| MBTS | 1.52 | 0.75 | | 0.75 | | | | 0.75 | | | | 0.75 | |
| CBS | 1.39 | | | | | 1 | | | | 1 | | | |
| FMB Sp Gr | | 1.064 | | 1.063 | | 1.073 | | 1.073 | | 1.084 | | 1.064 | |

| Compound No. | | 1 | 2 | 3 | 4 | 5 | 6 |
|---|---|---|---|---|---|---|---|
| Mooney Vis., ML, 1 + 4, 100° C. | | 43.0 | 40.2 | 38.2 | 33.0 | 31.0 | 48.0 |
| Mooney Scorch, 5 pt. min. | | 11.2 | 11.1 | 38.9 | 13.1 | 37.2 | 9.7 |
| 125° C. ML 35 pt. min. | | 33.5 | 37.3 | 63.0 | 35.6 | 44.8 | 18.5 |
| Minimum Reading | | 31.3 | 30.6 | 27.7 | 21.8 | 20.1 | 36.4 |
| Rheometer, Arc. ± 3° | | | | | | | |
| 160° C. | ML, lb. inch | 8.0 | 6.0 | 7.5 | 4.8 | 4.8 | 9.2 |
| | MH, lb. inch | 44.8 | 40.3 | 57.6 | 33.7 | 55.6 | 53.9 |
| | Ts2, m.s | 3.0 | 3.1 | 5.2 | 2.7 | 3.6 | 2.9 |
| | Tc90, m.s | 13.8 | 14.4 | 9.9 | 9.8 | 7.4 | 19.4 |
| Original | Cure Time, Min. | 14 | 15 | 10 | 10 | 8 | 20 |
| Cured | Hardness, Shore A | 49 | 47 | 53 | 46 | 54 | 52 |
| 160° C. | 100% Modulus, $Kg/cm^2$ | 10 | 8 | 13 | 8 | 13 | 13 |
| | 300% Modulus, $Kg/cm^2$ | 45 | 35 | 54 | 37 | 57 | 63 |
| | Tensile Strength, $Kg/cm^2$ | 144 | 143 | 173 | 169 | 182 | 153 |
| | Elongation, % | 670 | 750 | 690 | 750 | 630 | 590 |
| | Tear Strength, kg/cm | 30 | 52 | 34 | 26 | 67 | 31 |

| Test Items | 1 | 2 | 3 | 4 | 5 | 6 |
|---|---|---|---|---|---|---|
| Static Ozone Resistance | | | | | | |
| 40% Strain, 150 pphm, | | | | | | |
| 5.5 hrs | No | No | A-3 | No | A-1 | No |
| 22 hrs | No | No | | No | A-3 | No |
| 216 hrs | No | No | | No | | No |
| Dynamic Ozone Resistance | | | | | | |
| 40% Strain, 150 pphm, | | | | | | |
| 5.5 hrs | A-3 | No | B-3 | A-2 | A-3 | No |
| 22 hrs | A-4 | No | B-5 | A-4 | B-5 | No |
| 40 hrs | | A-1 | | | | A-1 |
| 20% Strain, 150 pphm, | | | | | | |
| 7 hrs | No | No | B-2 | No | A-2 | No |
| 31 hrs | No | No | B-4 | No | A-4 | No |
| 96 hrs | No | No | | B-1 | | No |
| 186 hrs | No | No | | C-2 | | No |
| Fatigue to Failure kc's | | | | | | |
| Ext 140% (Cam 24) Ave | 89 | 253 | 82 | 43 | 23 | |
| n = 6 Min | 221 | >371 | 40 | 35 | 21 | >371 |
| Max | 175 | 337 | 143 | 50 | 27 | >371 |

The code numbers shown in Table 1 under ozone resistance are representative of the following conditions: No=no cracks; A=a few cracks; B=many cracks; and C=uncountable cracks. Size of observed cracks are coded as follows: 1=microscopic cracks; 2=visible cracks; 3=<1 mm cracks; 4=1-3 nm cracks; and 5=>3 mm cracks.

The data in Table 1 shows the effect of the tung oil in compositions containing 30 phr of the brominated isobutylene/para-methylstyrene copolymer in a tire sidewall formulation. Examples 1 and 6 are controls containing no tung oil. Example 2, the same as Example 1 except for the inclusion of tung oil, showed a marked increase in tear strength, 52 kg/cm vs 30 kg/cm. In addition, ozone resistance was improved to a level equivalent to Example 6, a control compound containing 40 phr of the brominated copolymer.

EXAMPLE 7–10

Additional formulations as described in Table 2 were prepared and mixed by the process described in Examples 1–6. The formulations of Examples 7–9 contain brominated isobutylene/para-methylstyrene as the sole elastomer component and the formulation of Example 10 is based on a mixture of natural rubber and bromobutyl rubber as the sole elastomeric components.

In addition to the other properties evaluated, adhesions of formulations 7–9 to formulation 10 were evaluated by contacting strips of each milled formulation with a strip of formulation 10 to form a laminate, and curing the laminate.

TABLE 2

| Formulation | S.G. | 1 phr | 1 g | 2 phr | 2 g | 3 phr | 3 g | 4 phr | 4 g |
|---|---|---|---|---|---|---|---|---|---|
| EMDX89-4 | 0.93 | 100 | 670.0 | 100 | 670.0 | 100 | 650.0 | 0 | 0.0 |
| SMR #5 | 0.93 | 0 | 0.0 | 0 | 0.0 | 0 | 0.0 | 60 | 402.0 |
| BR 01 | 0.91 | 0 | 0.0 | 0 | 0.0 | 0 | 0.0 | 40 | 265.0 |
| GPF Black | 1.80 | 60 | 402.0 | 60 | 402.0 | 60 | 390.0 | 60 | 402.0 |
| Sunthene 410 | 0.90 | 15 | 100.5 | 15 | 100.5 | 15 | 97.5 | 15 | 100.5 |
| Stearic Acid | 0.64 | 1 | 6.7 | 1 | 6.7 | 1 | 6.5 | 1 | 6.7 |
| Zinc Stearate | 1.08 | 0.3 | 2.0 | 0.3 | 2.0 | 0.3 | 2.0 | | 0.0 |
| Tung Oil | 1.00 | 0 | 0.0 | 2 | 13.4 | 5 | 32.5 | | 0.0 |
| Zinc Oxide #3 | 5.55 | | 0.0 | | 0.0 | | 0.0 | 5 | 33.5 |
| | 1 | | 0.0 | | 0.0 | | 0.0 | | 0.0 |
| | 1 | | 0.0 | | 0.0 | | 0.0 | | 0.0 |
| | 1 | | 0.0 | | 0.0 | | 0.0 | | 0.0 |
| | 1.00 | | 0.0 | | 0.0 | | 0.0 | | 0.0 |
| Total | | 176.3 | 1181.2 | 178.3 | 1194.6 | 181.3 | 1176.5 | 181 | 1212.7 |
| MB Sp Gr | | 1.109 | | 1.108 | | 1.106 | | 1.127 | |
| Batch Factor | | 6.7 | | 6.7 | | 6.5 | | 6.7 | |
| 1% Limitation, Min./Max. | | 1169.4 | 1193.0 | 1182.7 | 1206.6 | 1166.7 | 1190.2 | 1200.6 | 1224.8 |
| Curatives | | phr | g | phr | g | phr | g | phr | g |
| ZnO #3 | 5.55 | 2 | | 2 | | 2 | | | |
| Sulphur | 2.60 | 1 | | 1 | | 1 | | 2 | |
| MBTS | 1.52 | 2 | | 2 | | 2 | | | |
| CBS | 1.39 | | | | | | | 1 | |
| | 1.00 | | | | | | | | |
| FMB Sp Gr | | 1.125 | | 1.124 | | 1.121 | | 1.135 | |

| Compound No. | | 1 | 2 | 3 | 4 | Test Items | 1 | 2 | 3 | 4 |
|---|---|---|---|---|---|---|---|---|---|---|
| Mooney Vis., ML 1 + 4, 100° C. | | 55 | 52 | 48 | 37 | Static Ozone Resistance | Exposure Time: 75 hrs. | | | |
| Mooney Scorch. 5 pt. min. | | 23.8 | 32.1 | 29.9 | 33.8 | 40% Strain, 150 pphm, @ | None | None | None | None |
| 125° C. ML 35 pt. min. | | 34.7 | 45.4 | 41.9 | 36.2 | 40° C. | | | | |
| Minimum Reading | | 39.4 | 36.6 | 34 | 27.2 | Compression Set % | 100 | 96.6 | 91.1 | |
| Rheometer, Arc. ± 3° | | | | | | @ 150° C. × 70 hrs., 25% defl. | | | | |
| 160° C. | ML, lb. inch | 8.4 | 7.8 | 7.2 | 7.5 | | | | | |
| | MH, lb. inch | 22.4 | 21.2 | 21.8 | 62.9 | Adhesion to Comp #4 | | | | |
| | Ts2, m.s | 3.40 | 5.11 | 4.41 | 4.01 | 180° Peel kgl/inch | 11.6 | 15.4 | 19.5 | |
| | Tc90, m.s | 8.30 | 8.08 | 7.46 | 6.00 | I: Interfacial | (I) | (I) | (I) | |
| Original | Cure Time, Min. | 9 | 8 | 8 | 6 | | | | | |
| Cured | Hardness, Shore A | 50 | 49 | 47 | 55 | | | | | |
| 160° C. | 100% Modulus, $Kg/cm^2$ | 9 | 8 | 8 | 21 | | | | | |
| | 300% Modulus, $Kg/cm^2$ | 29 | 29 | 29 | 107 | | | | | |
| | Tensile Strength, $Kg/cm^2$ | 76 | 81 | 84 | 181 | | | | | |
| | Elongation, % | 660 | 870 | 930 | 480 | | | | | |
| | Tear Strength, kg/cm | 39 | 37 | 39 | 40 | | | | | |

Test results show that adhesion between the strips was greatly enhanced by the inclusion of tung oil in the brominated copolymer formulation, from 11.6 kg/in with respect to formula 7 containing no tung oil to 19.5 kg/in with respect to formula 9 containing 5 phr tung oil. These results are indicative of improved curing across the general purpose rubber and brominated isobutylene/para-methylstyrene interface due to enhanced covulcanization between the different polymer phases.

What is claimed is:

1. A process for preparing a vulcanized elastomer composition comprising:

a) forming a mixture of i) a chlorinated or bromonated elastomeric interpolymer of a C4 to C7 isomonoolefin and a para-alkylstyrene, ii) from about 0 to about 90% by weight based on the elastomer content of said composition of a at least one unsaturated elastomer, and iii) a vulcanization promoter comprising an unsaturated fatty acid glyceride oil containing from about 18 to about 22 carbon atoms and having an iodine value in excess of about 100, said glyceride being present in said composition in an amount effective to promote the vulcanization of said composition by heating the components under mixing conditions to a temperature in the range of about 100° to 180° C.;

b) adding to said mixture a curing system containing sulfur or a sulfur-containing curative in an amount sufficient to cure said composition; and c) subjecting said composition to vulcanization conditions.

* * * * *